(12) United States Patent
Shiobara

(10) Patent No.: US 9,031,464 B2
(45) Date of Patent: May 12, 2015

(54) DRIVE TRANSMISSION DEVICE AND IMAGE FORMATION APPARATUS

(71) Applicant: Oki Data Corporation, Tokyo (JP)

(72) Inventor: Toshimasa Shiobara, Tokyo (JP)

(73) Assignee: Oki Data Corporation, Tokyo (JP)

( * ) Notice: Subject to any disclaimer, the term of this patent is extended or adjusted under 35 U.S.C. 154(b) by 45 days.

(21) Appl. No.: 13/945,962

(22) Filed: Jul. 19, 2013

(65) Prior Publication Data

US 2014/0023396 A1 Jan. 23, 2014

(30) Foreign Application Priority Data

Jul. 23, 2012 (JP) ................. 2012-162783

(51) Int. Cl.
| | |
|---|---|
| G03G 15/00 | (2006.01) |
| F16D 3/18 | (2006.01) |
| F16D 3/02 | (2006.01) |
| F16D 3/04 | (2006.01) |
| F16D 3/16 | (2006.01) |

(52) U.S. Cl.
CPC ................. *G03G 15/757* (2013.01); *F16D 3/18* (2013.01); *F16D 3/02* (2013.01); *F16D 3/04* (2013.01); *F16D 3/16* (2013.01)

(58) Field of Classification Search
USPC ........................................... 399/167; 464/137
See application file for complete search history.

(56) References Cited

U.S. PATENT DOCUMENTS

| | | | |
|---|---|---|---|
| 8,103,192 B2* | 1/2012 | Takigawa et al. | 399/167 |
| 2002/0052243 A1* | 5/2002 | Doisaki | 464/137 |
| 2005/0111881 A1* | 5/2005 | Arimitsu et al. | 399/167 |
| 2008/0276756 A1* | 11/2008 | Marumoto | 74/721 |
| 2013/0216262 A1* | 8/2013 | Miyagawa et al. | 399/167 |

FOREIGN PATENT DOCUMENTS

| | | |
|---|---|---|
| JP | S46-24731 Y | 8/1971 |
| JP | H06-066327 A | 3/1994 |
| JP | 2010-032917 A | 2/2010 |

OTHER PUBLICATIONS

Maching Translation of JP-06-066327.*

* cited by examiner

*Primary Examiner* — G. M. Hyder
(74) *Attorney, Agent, or Firm* — Marvin A. Motsenbocker; Mots Law, PLLC

(57) ABSTRACT

A drive transmission device includes a first coupling member to be coupled to a drive shaft and including a first contact surface, a second coupling member to be coupled to a driven shaft and including a second contact surface, and an intermediate coupler disposed between the first and second coupling members. The intermediate coupler includes: a first intermediate contact surface opposed to the first contact surface and contacting the first contact surface with a first rolling member interposed in between; and a second intermediate contact surface opposed to the second contact surface and contacting the second contact surface with a second rolling member interposed in between. One of the contact surfaces and a corresponding one of the intermediate contact surfaces are formed point-symmetrically with respect to the center of a corresponding one of the rolling members.

10 Claims, 15 Drawing Sheets

DRIVE TRANSMISSION DEVICE AND IMAGE FORMATION APPARATUS

CROSS REFERENCE TO RELATED APPLICATIONS

This application claims priority based on 35 USC 119 from prior Japanese Patent Application No. 2012-162783 filed on Jul. 23, 2012, entitled "DRIVE TRANSMISSION DEVICE AND IMAGE FORMATION APPARATUS", the entire contents of which are incorporated herein by reference.

BACKGROUND OF THE INVENTION

Field of the Invention

The disclosure relates to a drive transmission device and an image formation apparatus.

Heretofore, an image formation apparatus (such as a printer, a copier, a facsimile, and a multifunction printer), here using a printer as an example, includes an image formation unit which is detachably disposed in a printer main body, i.e., a device main body and which includes a photosensitive drum, a charging roller, a development unit, and the like, and a LED head, a transfer roller, a fixing unit, and the like which are arranged opposed to the photosensitive drum.

When printing is performed using the printer, an electrostatic latent image is formed on the surface of the photosensitive drum by exposing the surface, uniformly charged by the charging roller, to light from the LED head. Then, toner is applied to the electrostatic latent image on the photosensitive drum and the electrostatic latent image is developed by the development unit, whereby a toner image is formed on the photosensitive drum. Subsequently, the toner image is transferred onto a sheet by the transfer roller, and is fixed onto the sheet by the fixing unit. Thereby, an image is formed on the sheet.

Meanwhile, the development unit includes a development roller, and the development roller is disposed in contact with, or close to but slightly away from, the photosensitive drum so as to apply toner to the electrostatic latent image on the photosensitive drum. The photosensitive drum and the development roller are connected to a drive motor through a rotation transmission system such as a gear train, whereby rotation caused by the driving provided by the drive motor is transmitted to the photosensitive drum and the development roller.

To this end, drive shafts for transmitting the rotation of the drive motor to the photosensitive drum and the development roller, respectively, are arranged in the device main body; driven shafts corresponding to the respective drive shafts are arranged in the image formation unit, and each drive shaft and the counterpart driven shaft are coupled to each other.

However, if there is a manufacturing error in the image formation unit, or if the image formation unit is not positioned accurately when the image formation unit is mounted into the device main body, the shaft misalignment between the drive shaft and the driven shaft might occur in the photosensitive drum or the development roller, which hinders sufficient transmission of torque.

Accordingly, in order to absorb the shaft misalignment, an Oldham coupling as a drive transmission device is disposed between the drive shaft and the driven shaft and is used to couple these shafts together.

The Oldham coupling includes: a drive-side coupling member coupled to the drive shaft; a driven-side coupling member coupled to the driven shaft; and an intermediate member configured to transmit torque from the drive shaft to the driven shaft while absorbing the shaft misalignment between these shafts. Contact sliding portions formed of a key and a key groove are formed between the drive-side coupling member and the intermediate member, and between the driven-side coupling member and the intermediate member, respectively (see Japanese Patent Application Publication No. 2010-32917 (Patent Document 1), for example).

SUMMARY OF THE INVENTION

However, because large torque is applied to the Oldham coupling, its high durability is difficult to achieve.

An embodiment of the invention aims to improve the durability of the Oldham coupling.

An aspect of the invention is a drive transmission device. The drive transmission device includes a first coupling member capable of being coupled to a drive shaft and including a first contact surface, a second coupling member capable of being coupled to a driven shaft and including a second contact surface and an intermediate coupler disposed between the first and second coupling members. The intermediate coupler includes: a first intermediate contact surface opposed to the first contact surface and contacting the first contact surface with a first rolling member interposed in between; and a second intermediate contact surface opposed to the second contact surface and contacting the second contact surface with a second rolling member interposed in between. One of the contact surfaces and a corresponding one of the intermediate contact surfaces are formed point-symmetrically with respect to the center of a corresponding one of the rolling members.

According to the aspects of the invention, even when torque transmitted from the drive shaft to the driven shaft is large, no large frictional load is applied to the first and second coupling members and the intermediate coupler, so that deformation of the first and second coupling members and the intermediate coupler can be inhibited. Thus, the durability of the Oldham coupling can be improved.

DETAILED DESCRIPTION OF EMBODIMENTS

Figure 1:
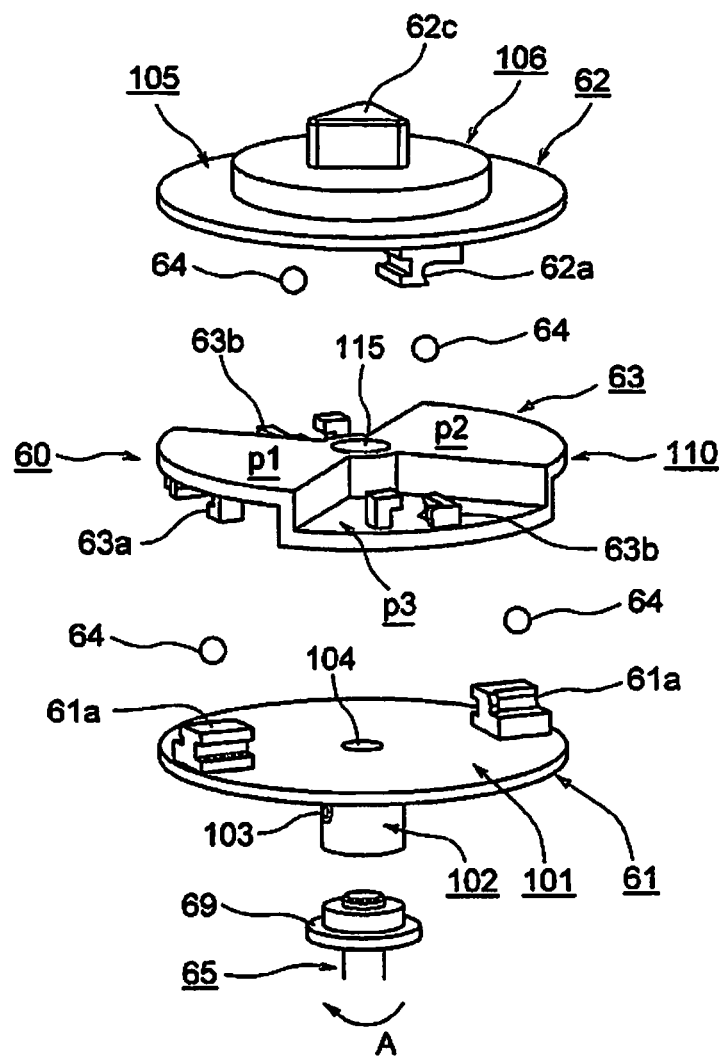
FIG. 1 is an exploded perspective view of an Oldham coupling according to a first embodiment of the invention.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

Hereinbelow, embodiments of the invention are described in detail with reference to the drawings. In the embodiments, a printer as an image formation apparatus is described.

Figure 2:
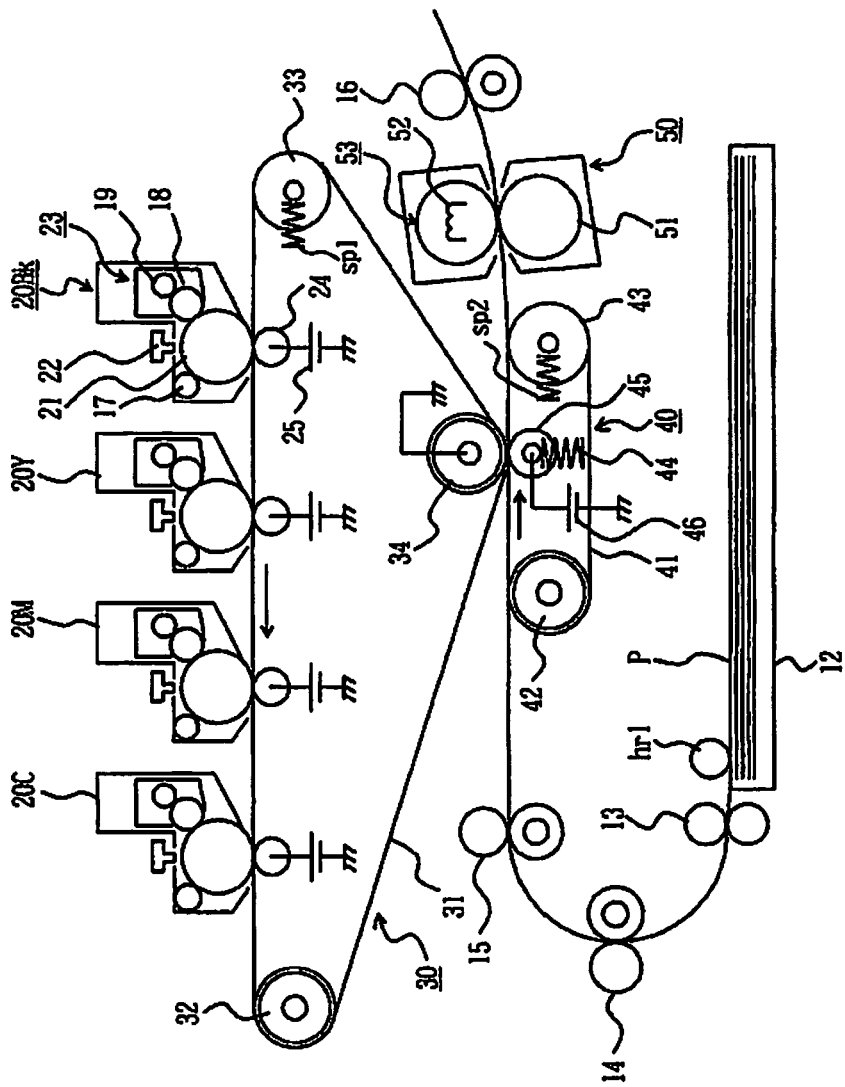
FIG. 2 is a schematic diagram of a printer according to the first embodiment of the invention.

FIG. 2 is a schematic diagram of a printer according to a first embodiment of the invention.

In FIG. 2, reference sign P indicates a sheet as a medium; 12 indicates a sheet cassette as a sheet feed unit and a medium storage unit for storing a stack of sheets P; hr1 indicates a pickup roller disposed at a front end of sheet cassette 12 and configured to pick up sheet P; 13 indicates feed rollers configured to feed sheet P picked up from sheet cassette 12; 14 indicates register rollers configured to correct skew of fed sheet P; 15 indicates conveyance rollers configured to convey sheet P subjected to skew correction; and 16 indicates discharge rollers configured to discharge sheet P with an image formed thereon to the outside of a printer main body, i.e., a device main body.

Reference signs 20Bk, 20Y, 20M, 20C indicate image formation units in which toner images as developer images of black, yellow, magenta, and cyan are formed on photosensitive drums 21 as image carriers, respectively; 30 indicates a primary transfer unit as a first transfer unit configured to form a toner image of full colors by sequentially transferring, onto belt 31 as a transfer medium, the toner images formed by the respective image formation units 20Bk, 20Y, 20M, and 20C; 40 indicates a secondary transfer unit as a second transfer unit configured to transfer, onto sheet P, the toner image of full colors transferred on belt 31; and 50 indicates fixing unit as a fixing device configured to fix the toner image of full colors, which is transferred on sheet P, onto sheet P by application of heat and pressure.

Image formation units 20Bk, 20Y, 20M, 20C are arranged detachably in the device main body, and adjacent to each other along belt 31 which is driven to travel in a direction indicated by an arrow. Each of the image formation units 20Bk, 20Y, 20M, 20C includes: photosensitive drum 21; charging roller 17 as a charging device disposed in contact with photosensitive drum 21 and configured to uniformly charge the surface of photosensitive drum 21; development unit 23 configured to develop an electrostatic latent image as a latent image; and the like. Development unit 23 is disposed in contact with, or close to but slightly away from, photosensitive drum 21. Development unit 23 includes: development roller 18 as a developer carrier configured to form a toner image by applying toner as a developer to the electrostatic latent image; toner supply roller 19 as a developer supply member disposed in contact with development roller 18 and configured to supply toner to development roller 18; and the like.

LED head 22 as an exposure device is disposed opposed to photosensitive drum 21 of each of image formation units 20Bk, 20Y, 20M, 20C. LED head 22 is configured to form an electrostatic latent image on the surface of photosensitive drum 21 on the basis of image data sent from a controller (not illustrated).

Primary transfer unit 30 includes: drive roller 32 as a first roller; driven roller 33 as a second roller; backup roller 34 as a third roller; transfer rollers 24 as transfer members for primary transfer being pressed against respective photosensitive drums 21 with belt 31 interposed in between; power supplies 25 configured to apply voltages to transfer rollers 24 respectively; spring sp1 as a bias member configured to bias driven roller 33 in a direction away from drive roller 32 so as to apply tension to belt 31; and the like. Belt 31 is stretched tightly by drive roller 32, driven roller 33, and backup roller 34. Here, a first transfer portion is formed between each photosensitive drum 21 and corresponding transfer roller 24.

Secondary transfer unit 40 includes: drive roller 42 as a first roller; driven roller 43 as a second roller; belt 41 being stretched tightly by drive roller 42 and driven roller 43 and driven to travel in a direction indicated by an arrow; transfer roller 45 as a transfer member for secondary transfer being pressed against backup roller 34 with belt 41 interposed in between; power supply 46 configured to apply a voltage to transfer roller 45; spring 44 as a bias member configured to bias transfer roller 45 toward backup roller 34; spring sp2 as a bias member configured to bias driven roller 43 in a direction away from drive roller 42 so as to apply tension to belt 41; and the like. Here, a second transfer portion is formed between transfer roller 45 and backup roller 34.

Fixing unit 50 includes: fixing roller 53 as a first roller; and backup roller 51 as a second roller. Heat source 52 is disposed inside fixing roller 53. Backup roller 51 is biased toward fixing roller 53 by a spring as a bias member (not illustrated).

Next, an operation of the printer having the above configuration is described.

First of all, a drive processing unit of the controller carries out drive processing. In this processing, the drive processing unit drives a drive motor as a drive unit for image formation (not illustrated) to rotate photosensitive drums 21, charging rollers 17, development rollers 18, and toner supply rollers 19. In addition, the drive processing unit drives a belt motor as a drive unit for a conveyance belt (not illustrated) to rotate drive rollers 32, 42 so as to allow belts 31, 41 to travel.

Once the printer receives print data from a host computer (not illustrated), an image processing unit of the controller carries out image processing. In this processing, the image processing unit creates image data based on the print data, and sends the image data to LED heads 22 of respective image formation units 208k, 20Y, 20M, 20C.

Then, a transfer processing unit of the controller carries out the transfer processing. In this processing, the transfer processing unit makes power supplies 25 apply voltages to transfer rollers 24 respectively, and makes power supply 46 apply a voltage to transfer roller 45.

Thereby, electrostatic latent images are formed on respective photosensitive drums 21, and are then developed by respective development units 23. In this way, toner images of the respective colors are formed. As belt 31 travels, the toner images of the respective colors thus formed are sequentially superimposed one on top of the other in the respective first transfer portions. A toner image of full colors is thereby formed on belt 31, and the toner image of full colors is sent to the second transfer portion.

Meanwhile, a conveyance processing unit of the controller carries out conveyance processing. In this processing, the conveyance processing unit drives a feed motor as a drive unit for sheet feeding (not illustrated) to rotate pickup roller hr1, and drives a conveyance motor as a drive unit for conveyance (not illustrated) to rotate feed rollers 13, register rollers 14, conveyance rollers 15, and discharge rollers 16.

Thereby, sheet P picked up from sheet cassette 12 is subjected to skew correction by register rollers 14, and the timing for sheet P and the toner image of full colors to arrive at the second transfer portion is matched by conveyance rollers 15. Then, the toner image of full colors is transferred onto sheet P in the second transfer portion. Subsequently, sheet P having the toner image of full colors transferred thereon is sent to fixing unit 50 where the toner image of full colors is fixed onto sheet P and a color image is thus formed thereon. Sheet P having the color image formed thereon is discharged to the outside of the device by discharge rollers 16.

In the meantime, in this embodiment, photosensitive drums 21, charging rollers 17, development rollers 18, and toner supply rollers 19, for example, are connected to the drive motor through a rotation transmission system such as a gear train (not illustrated), and are rotated in response to rotation caused by driving the drive motor. To this end, in the device main body, drive shafts configured to transmit rotation to photosensitive drums 21, charging rollers 17, development rollers 18, toner supply rollers 19, and the like are provided to certain gears of the rotation transmission system. Driven shafts configured to transmit the rotation of the drive shafts to photosensitive drums 21, charging rollers 17, development rollers 18, toner supply rollers 19, and the like respectively are provided in image formation units 20Bk, 20Y, 20M, and 20C. Each drive shaft and the counterpart driven shaft are coupled to each other. When each of image formation units 20Bk, 20Y, 20M, 20C is mounted into the device main body, the drive shaft and the driven shaft in a certain rotatable body out of photosensitive drum 21, charging roller 17, development roller 18, toner supply roller 19, and the like (in the case of this embodiment, photosensitive drum 21 is selected in order to improve the positional accuracy in image formation) are coupled to each other first. Then, using photosensitive drum 21 as a reference position, the image formation unit is positioned relative to photosensitive drum 21.

However, if there is a manufacturing error in any of image formation units 20Bk, 20Y, 20M, 20C, or if any of image formation units 20Bk, 20Y, 20M, 20C cannot be positioned accurately, the drive shafts and the driven shafts in the other rotatable bodies (i.e., in charging roller 17, development roller 18, toner supply roller 19, and the like) might be misaligned, that is, the shaft misalignment might occur between these shafts.

Accordingly, in this embodiment, in order to absorb the shaft misalignment which might occur between the drive shaft and the driven shaft in charging roller 17, development roller 18, toner supply roller 19, and the like, the drive shaft and the driven shaft are coupled to each other through an Oldham coupling as a drive transmission device and as an Oldham's shaft coupling.

Next, the Oldham coupling is described. Note that, because image formation units 20Bk, 20Y, 20M, 20C have the same structure, and Oldham couplings disposed between the drive shaft and the driven shaft in charging roller 17, development roller 18, toner supply roller 19, and the like of each of image formation units 20Bk, 20Y, 20M, 20C also have the same structure, an Oldham coupling is described disposed between the drive shaft and the driven shaft in development roller 18 of image formation unit 20Bk.

Figure 3:
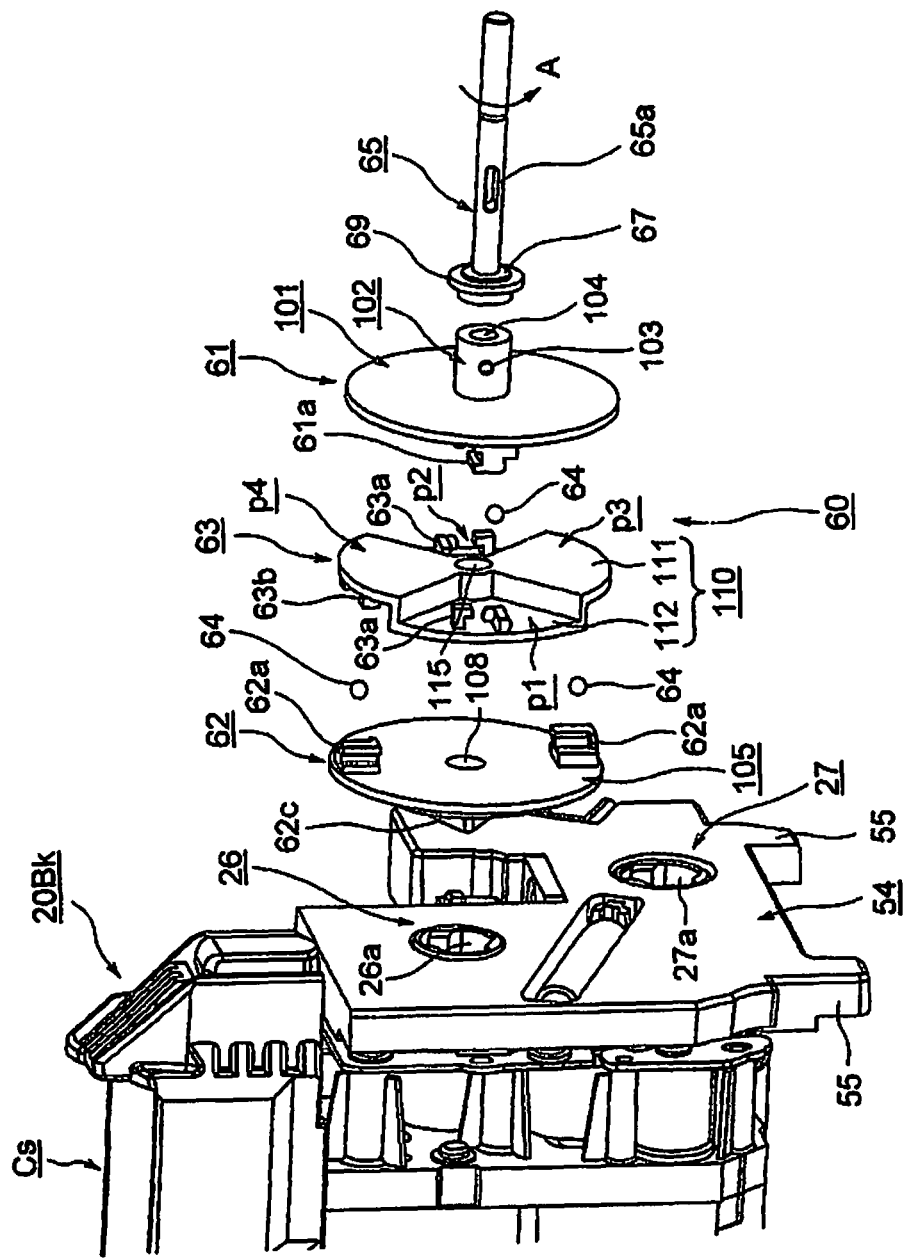
FIG. 3 is a view describing the relation between the image formation unit and the Oldham coupling according to the first embodiment of the invention.
Figure 4:
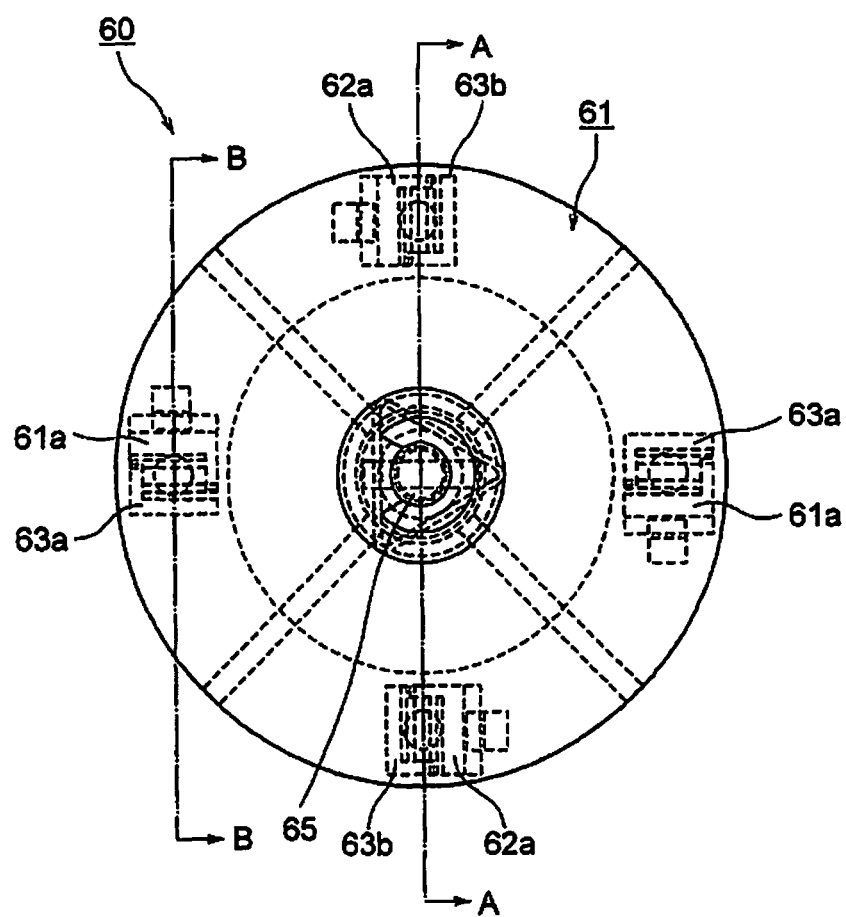
FIG. 4 is a side view of the Oldham coupling according to the first embodiment of the invention.
Figure 5:
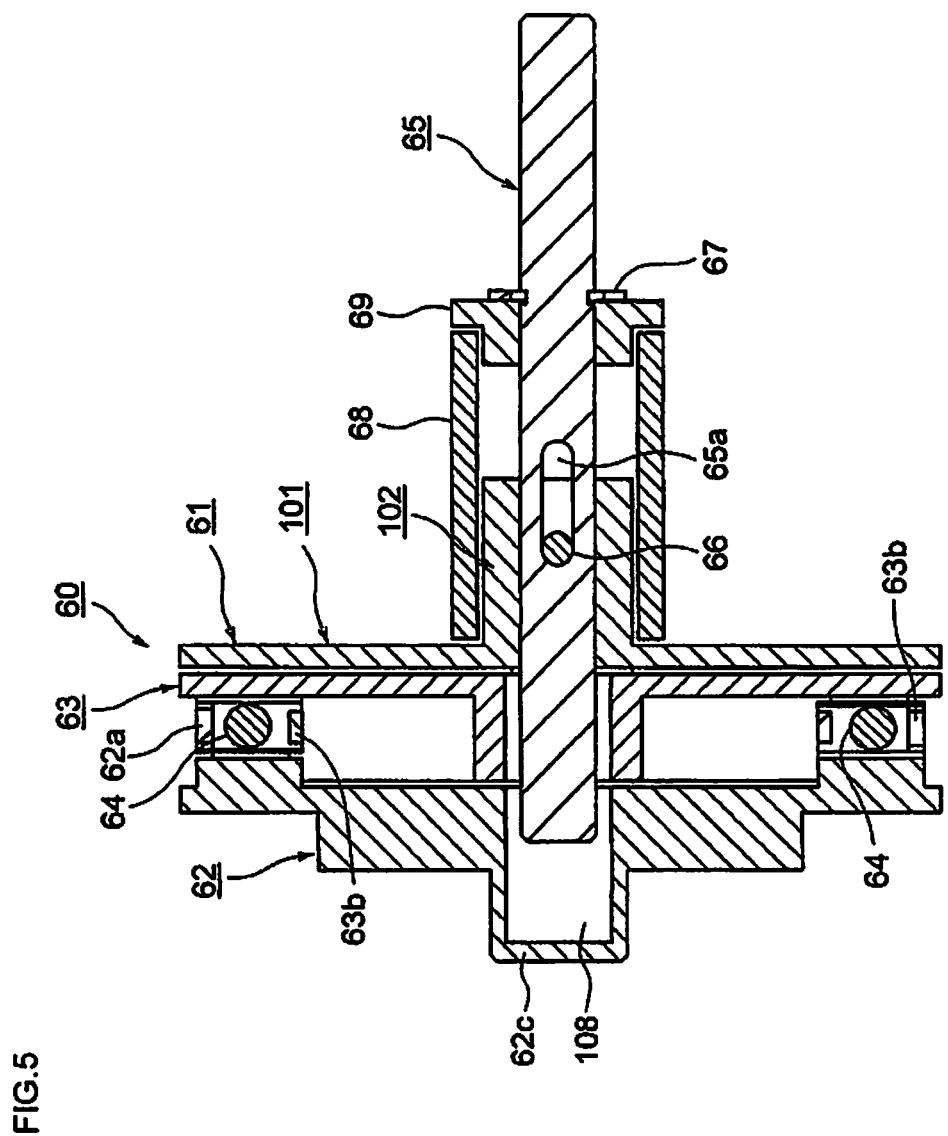
FIG. 5 is a cross-sectional view of FIG. 4 taken along the line A-A.
Figure 6:
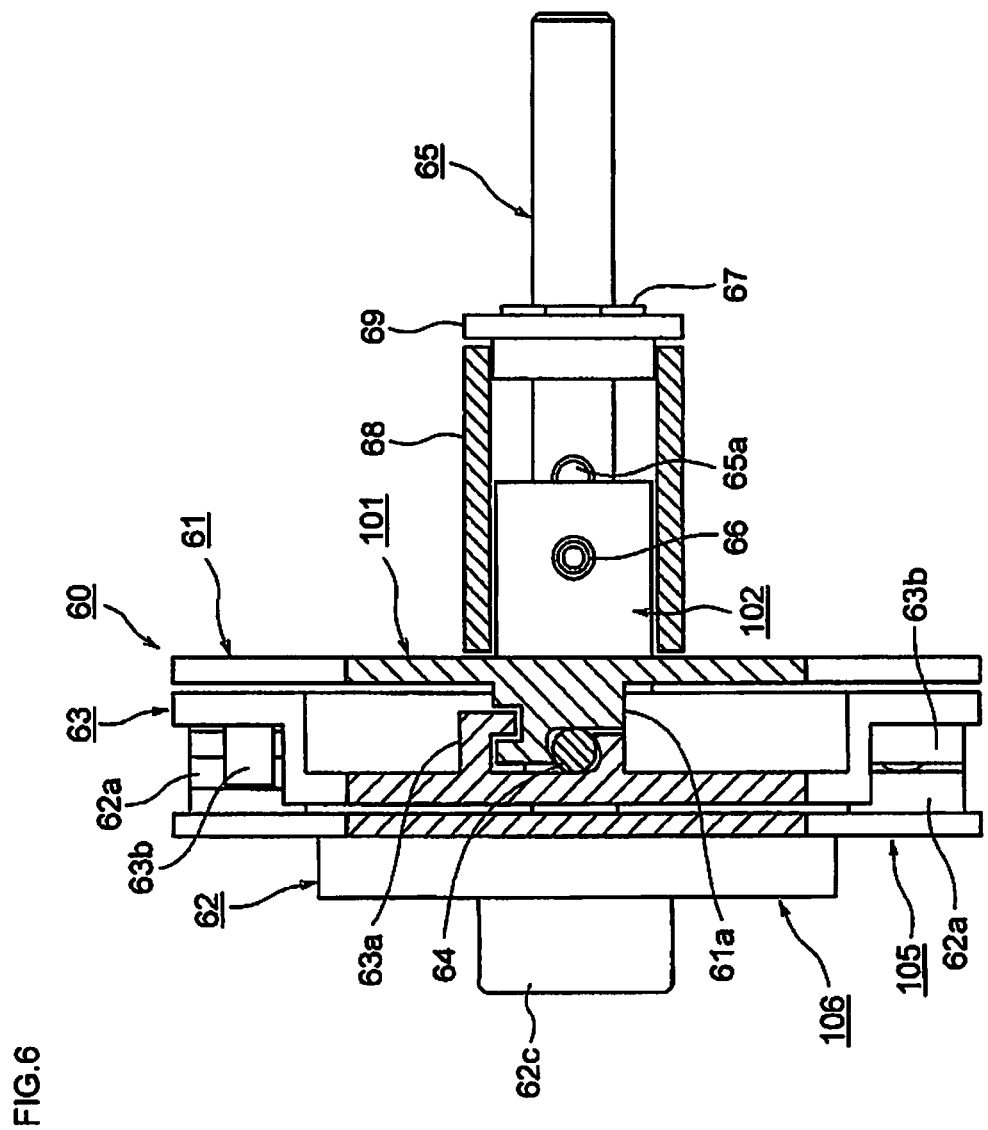
FIG. 6 is a cross-sectional view of FIG. 4 taken along the line B-B.

FIG. 1 is an exploded perspective view of an Oldham coupling according to the first embodiment of the invention. FIG. 3 is a view describing the relation between the image formation unit and the Oldham coupling according to the first embodiment of the invention. FIG. 4 is a side view of the Oldham coupling according to the first embodiment of the invention. FIG. 5 is a cross-sectional view of FIG. 4 taken along the line A-A. FIG. 6 is a cross-sectional view of FIG. 4 taken along the line B-B.

In the drawings, reference sign 20Bk indicates the image formation unit, Cs indicates the chassis of image formation unit 20Bk, 54 indicates sidewalls arranged at both ends in a longitudinal direction of image formation unit 20Bk (only one of sidewalls 54 is illustrated in FIG. 3), and 55 indicates leg portions protruding at lower ends of each side wall 54. When image formation unit 20Bk is mounted into the device main body, leg portions 55 are brought into contact with a support portion of the device main body (not illustrated). Driven shaft 26 as a first drive input unit configured to transmit the rotation of the drive motor to development roller 18 (FIG. 2), and driven shaft 27 as a second drive input unit configured to transmit the rotation of the drive motor to photosensitive drum 21, are rotatably arranged in sidewall 54 in such a way as to penetrate sidewall 54. Fitting hole 26a as a driven-side fitting portion having a certain shape (triangle shape in this embodiment) is formed in driven shaft 26, and fitting hole 27a as a driven-side fitting portion having a certain shape (triangle shape in this embodiment) is formed in driven shaft 27.

Here, in image formation unit 20Bk, a drive gear (not illustrated) is attached to driven shaft 26, and meshes with a driven gear attached to one end of development roller 18. In addition, in image formation unit 20Bk, driven shaft 27 and photosensitive drum 21 are coupled to each other.

Reference sign 60 indicates the Oldham coupling, and 65 indicates a drive shaft which is attached to a certain gear of the rotation transmission system disposed in the device main body and which is driven to rotate in the direction indicated by an arrow A.

Oldham coupling 60 includes: drive-side coupling member 61 as a first coupling member rotatably disposed on the same axis as drive shaft 65, and coupled to drive shaft 65 in such a way as to be incapable of rotating but axially movable relative to drive shaft 65; driven-side coupling member 62 as a second coupling member rotatably disposed on the same axis as driven shaft 26, and fitted into and coupled to driven shaft 26 in such a way as to be incapable of rotating relative to driven shaft 26; intermediate disc 63 as an intermediate coupler rotatably disposed between drive-side coupling member 61 and driven-side coupling member 62 in such a way as to be radially movable relative to drive-side coupling member 61 and driven-side coupling member 62, and configured to absorb shaft misalignment caused between drive shaft 65 and driven shaft 26; and rolling members 64 having a spherical shape (formed of spheres), being arranged between drive-side coupling member 61 and intermediate disc 63 and between driven-side coupling member 62 and intermediate disc 63, and being in contact with surfaces of respective drive-side coupling member 61 and driven-side coupling member 62 in such a way as to be capable of rolling on the surfaces.

Long hole 65a as a to-be-locked portion penetrates a central portion in a longitudinal direction of drive shaft 65.

Drive-side coupling member 61 includes: circular flange portion 101; boss portion 102 protruding toward drive shaft 65 at the center of one of the surfaces, i.e., the front surface (the surface closer to drive shaft 65) of flange portion 101; first engagement portions 61a protruding toward driven shaft 26 at two positions of a circumferential portion of the other surface, i.e., the back surface (the surface closer to driven shaft 26) of flange portion 101 while being circumferentially spaced apart from each other by 180 degrees; and pin hole 103 formed in boss portion 102 at a position matching long hole 65a.

As illustrated in FIG. 5, pin 66 as a locking portion is press-fitted and fitted in pin hole 103 to lock pin 66 with long hole 65a. Thereby, drive-side coupling member 61 is allowed to axially move relative to drive shaft 65 by a length equivalent to the length of long hole 65a.

Through-hole 104 for housing drive shaft 65 by allowing it to penetrate therethrough is formed at the center of drive-side coupling member 61.

Annular spring bearing 69 as a bearing member is disposed in drive shaft 65 at a position closer to the device main body than long hole 65a. Axial movement of spring bearing 69 is restricted by stopper ring 67 as a stopper. In addition, spring 68 as a bias member is disposed between drive-side coupling member 61 and spring bearing 69 in such a way as to be fitted onto boss portion 102. Spring 68 can thereby bias Oldham coupling 60 against drive shaft 65 and toward driven shaft 26.

Driven-side coupling member 62 includes: circular flange portion 105 having the same diameter as flange portion 101; boss portion 106 protruding toward driven shaft 26 at the center of one of the surfaces, i.e., the front surface (surface closer to driven shaft 26) of flange portion 105; fitting protrusion 62c as a drive-side fitting portion protruding toward driven shaft 26 more than boss portion 106 at the center of boss portion 106 and having a shape suited to the shape of fitting hole 26a (triangle shape in this embodiment); and second engagement portions 62a protruding toward drive shaft 65 at two positions of a circumferential portion of the other surface, i.e., the back surface (surface closer to drive shaft 65) of flange portion 105 while being circumferentially spaced apart from each other by 180 degrees, and fitting protrusion 62c is fitted into fitting hole 26a. In addition, recess portion 108 is formed at the center of driven-shaft coupling member 62 and is configured to house the tip end of drive shaft 65 when Oldham coupling 60 is moved toward drive shaft 65 against the biasing force of spring 68.

Note that, in this embodiment, fitting hole 26a is formed in driven shaft 26 and fitting protrusion 62c is formed on driven-side coupling member 62. However, alternatively, a fitting protrusion may be formed on driven shaft 26 and a fitting hole may be formed in driven-side coupling member 62.

Intermediate disc 63 includes: circular plate portion 110 having the same diameter as flange portions 101, 105; first intermediate engagement portions 63a protruding toward drive shaft 65 at two positions of a circumferential potion of one of the surfaces (surface closer to drive shaft 65) of plate portion 110 while being circumferentially spaced apart from each other by 180 degrees; and second intermediate engagement portions 63b protruding toward driven shaft 26 at two positions of a circumferential portion of the other surface (surface closer to driven shaft 26) of plate portion 110 while being circumferentially spaced apart from each other by 180 degrees. First intermediate engagement portions 63a and first engagement portions 61a engage with each other respectively, with rolling members 64 interposed in between, in such a way as to be radially movable relative to each other, whereas second intermediate engagement portions 63b and second engagement portions 62a engage with each other respectively, with rolling members 64 interposed in between, in such a way as to be radially movable relative to each other. Accordingly, rolling members 64 are rolled as first intermediate engagement portions 63a and first engagement portions 61a are moved relative to each other and second intermediate engagement portions 63b and second engagement portions 62a are moved relative to each other. These engagement portions 61a, 62a, 63a, 63b constitute contact sliding portions.

Plate portion 110 of intermediate disc 63 includes four fan-shaped areas p1 to p4 each extending over an angle of 90 degrees in the circumferential direction of the disc. First engagement portions 63a are formed in areas p1, p2 and second intermediate engagement portions 63b are formed in areas p3, p4 while being circumferentially spaced apart from one another by 90 degrees. The set of areas p1, p2 and the set of areas p3, p4 are defined in reverse portions 111, 112 in such a way that their axial positions differ from each other so that areas p1, p2 can contact driven-side coupling member 62 and areas p3, p4 can contact drive-side coupling member 61. In addition, through-hole 115 for housing drive shaft 65 by allowing it to penetrate therethrough is formed at the center of intermediate disc 63.

Next, a description is given of how first intermediate engagement portions 63a and first engagement portions 61a engage with each other and how second intermediate engagement portions 63b and second engagement portions 62a engage with each other. Note that, first engagement portion 61a and second engagement portion 62a have the same structure and first intermediate engagement portion 63a and second intermediate engagement portion 63b have the same structure. Thus, the description is given only of how first intermediate engagement portions 63a and first engagement portions 61a engage with each other, and is not given of how second intermediate engagement portions 63b and second engagement portions 62a engage with each other.

Figure 7:
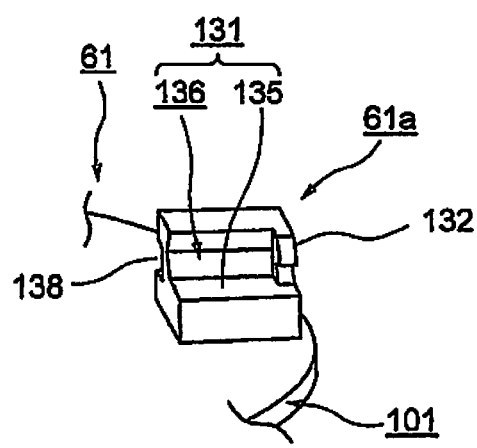
FIG. 7 is a perspective view of an engagement portion disposed in a drive-side coupling member according to the first embodiment of the invention.
Figure 8:
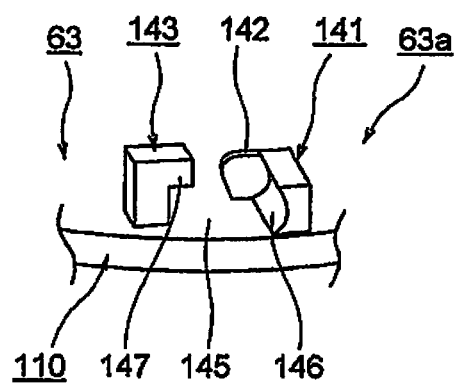
FIG. 8 is a perspective view of an engagement portion disposed in an intermediate disc according to the first embodiment of the invention.
Figure 9:
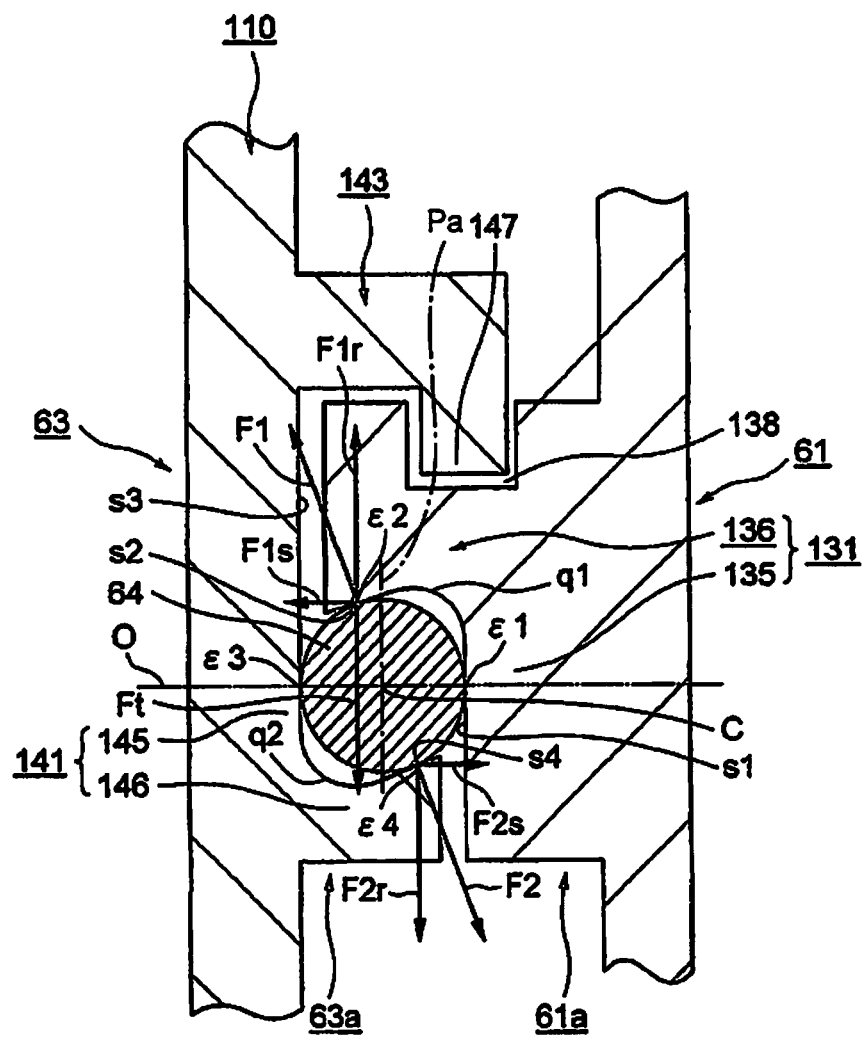
FIG. 9 is a diagram illustrating how the engagement portions according to the first embodiment of the invention engage with each other.

FIG. 7 is a perspective view of the engagement portion disposed in the drive-side coupling member according to the first embodiment of the invention. FIG. 8 is a perspective view of the engagement portion disposed in the intermediate disc according to the first embodiment of the invention. FIG. 9 is a diagram illustrating how the engagement portions engage with each other according to the first embodiment of the invention.

In the drawings, reference sign 61 indicates the drive-side coupling member, 63 indicates the intermediate disc, 61a and 63a indicate engagement portions, 101 indicates a flange portion, and 110 indicates a plate portion.

First engagement portion 61a has a certain shape (an "L" shape in this embodiment). Engagement portion 61a includes: holding portion 131 configured to hold rolling member 64; and stopper 132 formed at an inner end or outer end (outer end in FIG. 7), in the radial direction of drive-side coupling member 61, of holding portion 131 and configured to prevent rolling member 64 from slipping off holding portion 131. Holding portion 131 includes: base portion 135 extending in a rotation direction of drive-side coupling member 61; and protrusion portion 136 standing on base portion 135 axially toward intermediate disc 63 and extending in the radial direction of drive-side coupling member 61. Locking groove 138 is formed in the back surface of protrusion portion 136.

First intermediate engagement portion 63a includes: holding portion 141 configured to hold rolling member 64; stopper 142 formed at an inner end or outer end (inner end in FIG. 8), in the radial direction of intermediate disc 63, of holding portion 141 and configured to prevent rolling member 64 from slipping off holding portion 141; and locking portion 143 formed a certain distance away from holding portion 141. Holding portion 141 includes: base portion 145 being formed of plate portion 110 and extending in a rotation direction of intermediate disc 63; and protrusion portion 146 standing on base portion 145 axially toward drive-side coupling member 61 and extending in the radial direction of intermediate disc 63. Locking portion 143 stands on plate portion 110 axially toward drive-side coupling member 61, and has at its tip end locking protrusion 147 to enter locking groove 138.

Neck portion q1 is formed between base portion 135 and protrusion portion 136 in first engagement portion 61a, and neck portion q2 is formed between base portion 145 and protrusion portion 146 in first intermediate engagement portion 63a. Opposing surfaces s1, s3 of respective base portions 135, 145 both extend perpendicularly to axis O which is on the same axis as drive shaft 65. In this embodiment, opposing surfaces s1, s3 are contact surfaces s1, s3 to contact rolling member 64. Meanwhile, contact surfaces s2, s4 of respective protrusion portions 136, 146 with rolling member 64 both extend while being slightly inclined at the same angle with respect to axis O which is on the same axis as drive shaft 65. Contact surfaces s2, s4 are formed point-symmetrically with respect to center C of rolling member 64. Here, opposing surfaces (contact surfaces) s1, s3 are also formed point-symmetrically with respect to center C of rolling member 64.

Rolling member 64 and first engagement portion 61a contact each other at two positions, i.e., at point є1 on base portion 135 and point є2 on protrusion portion 136, and rolling member 64 and first intermediate engagement portion 63a contact each other at two positions, i.e., at point є3 on base portion 145 and point є4 on protrusion portion 196. Here, contact surfaces s1, s3 are formed point-symmetrically with respect to center C of rolling member 64, and contact surfaces s2, s9 are also formed point-symmetrically with respect to center C of rolling member 64. Accordingly, contact points (є1, є2) of rolling member 64 with first engagement portion 61a and contact points (є3, є4) of rolling member 64 with first intermediate engagement portion 63a are located point-symmetrically with respect to center C of rolling member 64.

In the meantime, when engagement portion 61a pushes against rolling member 64 with force Ft at point є2 as torque is transmitted from drive-side coupling member 61 to intermediate disc 63, rolling member 64 pushes back against engagement portion 61a with force (reaction force) F1 at point є2 as well as pushes against contact surface s4 with protrusion portion 146 with force F2 at point є4. Since rolling member 64 contacts engagement portions 61a, 63a at the positions which are point-symmetrical with respect to center C of rolling member 64, component force in the axis direction (hereinafter referred to as "axial component force") F1s of force F1 and axial component force F2s of force F2 cancel each other, and component force in a direction perpendicular to the axis direction (hereinafter referred to as "radial component force") F1r of force F1 and radial component force F2r of force F2 cancel each other.

Hence, engagement portions 61a, 63a are never moved axially or radially as torque is transmitted from drive-side coupling member 61 to intermediate disc 63. This enables a stable transmission of torque.

Next, a description is given of how to mount image formation unit 20Bk of the above configuration into the device main body.

When image formation unit 20Bk with Oldham coupling 60 previously attached to drive shaft 65 is disposed on the support portion of the device main body while being moved in the axis direction of drive shaft 65, fitting protrusion 62c is fitted into fitting hole 26a, and Oldham coupling 60 is thereby coupled to driven shaft 26. In this event, in the case where fitting protrusion 62c cannot be fitted into fitting hole 26a due to the rotational phase mismatch between fitting protrusion 62c and fitting hole 26a, Oldham coupling 60 is moved in the axis direction of drive shaft 65 against the biasing force of spring 68 and is retreated. Then, drive shaft 65, driven to rotate by the drive motor, rotates Oldham coupling 60 until the rotational phases of fitting protrusion 62c and fitting hole 26a match each other. Thereby, fitting protrusion 62c is fitted into fitting hole 26a with the assistance of the biasing force of spring 68.

Here, in order to couple the drive shaft and driven shaft 27 in photosensitive drum 21 to each other, a fitting protrusion formed at the tip end of the drive shaft is designed to be fitted into fitting hole 27a (FIG. 3) of driven shaft 27. In addition, the drive shaft for photosensitive drum 21 has such a structure that its fitting protrusion is retreated when it cannot be fitted into fitting hole 27a.

Next, an operation of Oldham coupling 60 having the above configuration is described.

Figure 10:
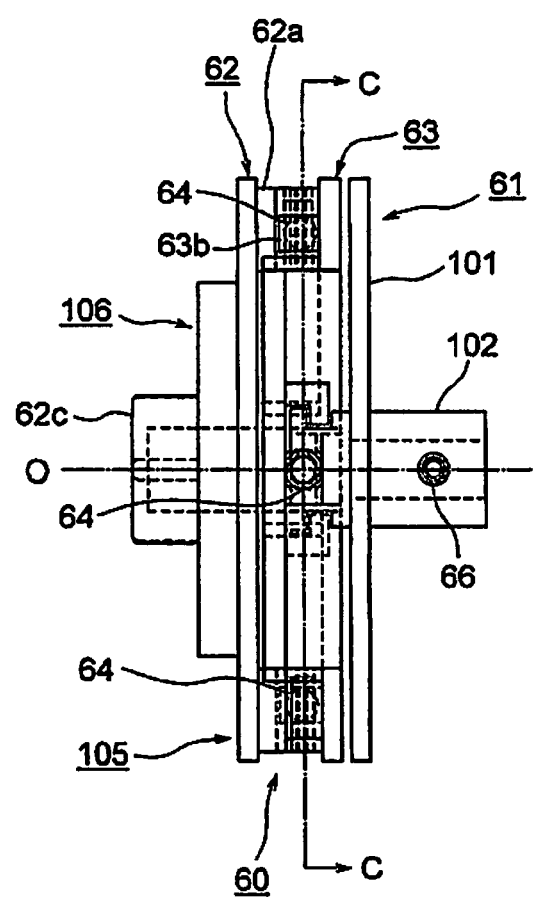
FIG. 10 is a front view of the Oldham coupling according to the first embodiment of the invention.
Figure 11:
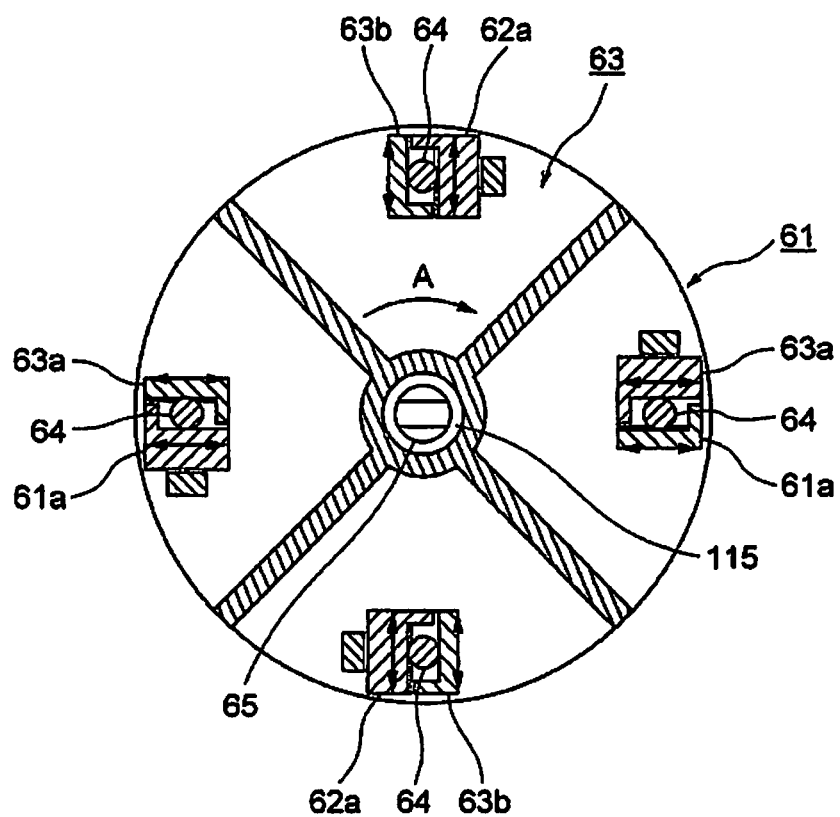
FIG. 11 is a cross-sectional view of FIG. 10 taken along the line C-C.

FIG. 10 is a front view of the Oldham coupling according to the first embodiment of the invention, and FIG. 11 is a cross-sectional view of FIG. 10 taken along the line C-C.

Once drive shaft 65 is rotated in response to the rotation of the drive motor, drive-side coupling member 61 is rotated. With the rotation of drive-side coupling member 61, engagement portion 61a and engagement portion 63a of intermediate disc 63 engage with each other with rolling member 64 interposed in between and torque (rotation) is transmitted to intermediate disc 63, whereby intermediate disc 63 is rotated. With the rotation of intermediate disc 63, engagement portion 63b and engagement portion 62a of driven-side coupling member 62 engage with each other with rolling member 64 interposed in between and torque is transmitted to driven-side coupling member 62, whereby driven-side coupling member 62 is rotated.

Here, the inner diameter of through-hole 115 of intermediate disc 63 is set larger than the outer diameter of drive shaft 65 by a certain amount. Thereby, without any radial constraint, intermediate disc 63 is allowed to move radially relative to drive-side coupling member 61 and driven-side coupling member 62.

Accordingly, engagement portion 61a and engagement portion 63a, or engagement portion 63b and engagement portion 62a, are allowed to move relative to each other in directions indicated by arrows in FIG. 11, i.e., in the radial direction of Oldham coupling 60. As a result, the shaft misalignment that might occur between drive shaft 65 and driven shaft 26 can be absorbed.

Meanwhile, engagement portion 61a and engagement portion 63a, or engagement portion 63b and engagement portion 62a, engage with each other with rolling member 64 interposed in between, and rolling member 64 is rolled with the movement of these portions in the direction indicated by the arrow A. Accordingly, even when torque transmitted from drive shaft 65 to driven shaft 26 is large, it is possible to inhibit engagement portions 61a, 62a, 63a, 63b from being deformed due to application of a large frictional load between engagement portion 61a and engagement portion 63a or between engagement portion 63b and engagement portion 62a. Thus, engagement portions 61a, 62a, 63a, 63b can be operated smoothly without any lubricant such as oil, and therefore no excess load torque is applied to Oldham coupling 60. As a result, a decrease in the durability of Oldham coupling 60 is suppressed.

Meanwhile, contact surfaces s2, s4 of protrusion portions 136, 146 with rolling member 64 are slightly inclined with respect to axis O which is on the same axis as drive shaft 65. Thereby, even when engagement portion 61a pushes against rolling member 64 with large force Ft upon application of an external force to Oldham coupling 60, or when the axes of drive-side coupling member 61 and driven-side coupling member 62 are inclined and contact surfaces s2, s4 of protrusion portions 136, 146 with rolling member 64 are inclined due to the shaft misalignment between drive shaft 65 and driven shaft 26, it is possible to prevent rolling member 64 from slipping off holding portions 131, 141.

Next, a second embodiment of the invention is described. Note that parts having the same structure as those of the first embodiment are given the same reference signs, and the effects of the first embodiment are used as the effects of the invention of such parts.

Figure 12:
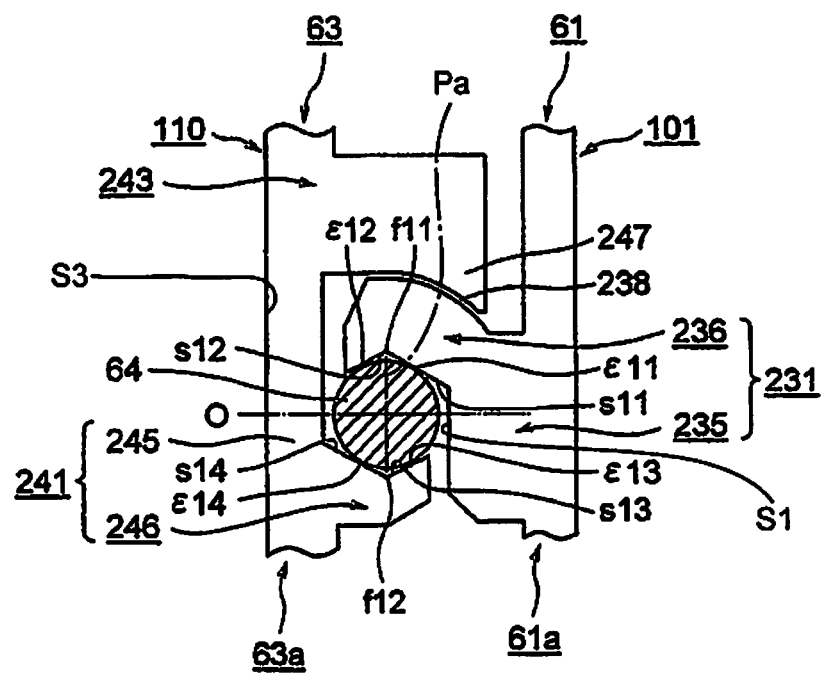
FIG. 12 is a first diagram illustrating how engagement portions according to a second embodiment of the invention engage with each other.
Figure 13:
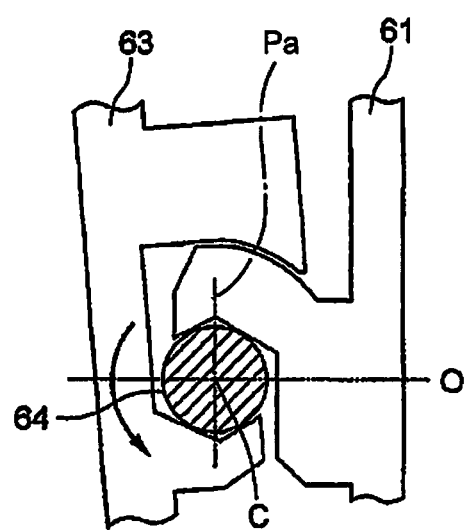
FIG. 13 is a second diagram illustrating how the engagement portions according to the second embodiment of the invention engage with each other.
Figure 14:
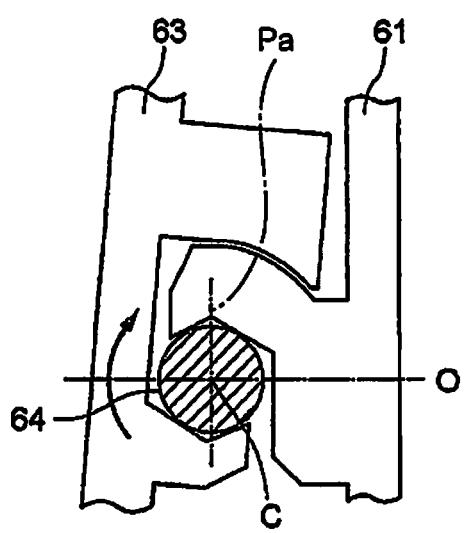
FIG. 14 is a third diagram illustrating how the engagement portions according to the second embodiment of the invention engage with each other.

FIG. 12 is a first diagram illustrating how engagement portions according to the second embodiment of the invention engage with each other. FIG. 13 is a second diagram illustrating how the engagement portions according to the second embodiment of the invention engage with each other. FIG. 14 is a third diagram illustrating how the engagement portions according to the second embodiment of the invention engage with each other.

In the drawings, reference sign 61 indicates a drive-side coupling member as a first coupling member, 63 indicates an intermediate disc as an intermediate coupler, 61a, 63a indicate engagement portions, 101 indicates flange portion, and 110 indicates a plate portion.

Engagement portion 61a has a certain shape (an "L" shape in this embodiment). Engagement portion 61a includes: holding portion 231 configured to hold rolling member 64; and stopper 132 (FIG. 7) formed at an inner end or outer end, in a radial direction of drive-side coupling member 61, of holding portion 231 and configured to prevent rolling member 64 from slipping off holding portion 231. Holding portion 231 includes: base portion 235 extending in a rotation direction of drive-side coupling member 61; and protrusion portion 236 standing on base portion 235 axially toward intermediate disc 63 and extending in the radial direction of drive-side coupling member 61. Locking groove 238 is formed in the back surface of protrusion portion 236.

Engagement portion 63a includes: holding portion 291 configured to hold rolling member 64; stopper 142 (FIG. 8) formed at an inner end or outer end, in the radial direction of intermediate disc 63, of holding portion 241 and configured to prevent rolling member 64 from slipping off holding portion 241; and locking portion 243 formed a certain distance away from holding portion 241. Holding portion 241 includes: base portion 245 being formed of plate portion 110 and extending in a rotation direction of intermediate disc 63; and protrusion portion 246 standing on base portion 245 axially toward drive-side coupling member 61 and extending in the radial direction of intermediate disc 63. Locking portion 243 stands on plate portion 110 axially toward drive-side coupling member 61, and has at its tip end locking protrusion 247 to enter locking groove 238.

Protrusion portion 236 has two contact surfaces s11, s12 to contact rolling member 64. Contact surfaces s11, s12 are both slightly inclined at the same angle with respect to axis O which is on the same axis as drive shaft 65. Contact surfaces s11, s12 thereby form a V-shaped groove with an obtuse angle at their intersection f11. Meanwhile, protrusion portion 246 has two contact surfaces s13, s14 to contact rolling member 64. Contact surfaces s13, s14 are both slightly inclined at the same angle with respect to axis O which is on the same axis as drive shaft 65. Contact surfaces s13, s14 thereby form a V-shaped groove with an obtuse angle at their intersection f12. Here, a line segment connecting intersections f11, f12 extends at a right angle to axis O which is on the same axis as drive shaft 65.

Rolling member 64 and engagement portion 61a contact each other at two positions, i.e., at points ϵ11, ϵ12 on protrusion portion 236, and rolling member 64 and engagement portion 63a contact each other at two positions, i.e., at points ϵ13, ϵ14 on protrusion portion 246. Here, contact surfaces s11, s13 are formed point-symmetrically with respect to center C of rolling member 64, and contact surfaces s12, s14 are formed point-symmetrically with respect to center C of rolling member 64. Accordingly, contact points (ϵ11, ϵ12) of rolling member 64 with engagement portion 61a and contact points (ϵ13, ϵ14) of rolling member 64 with engagement portion 63a are located point-symmetrically with respect to center C of rolling member 64.

Next, an operation of Oldham coupling 60 as a drive transmission device and as an Oldham's shaft coupling is described.

Once drive shaft 65 is rotated in response to the rotation of the drive motor, drive-side coupling member 61 is rotated. With the rotation of drive-side coupling member 61, engagement portion 61a and engagement portion 63a of intermediate disc 63 engage with each other with rolling member 64 interposed in between and torque is transmitted to intermediate disc 63, whereby intermediate disc 63 is rotated. With the rotation of intermediate disc 63, engagement portion 63b and engagement portion 62a of driven-side coupling member 62 as a second coupling member engage with each other with rolling member 64 interposed in between and torque is transmitted to driven-side coupling member 62, whereby driven-side coupling member 62 is rotated.

Accordingly, engagement portion 61a and engagement portion 63a, as well as engagement portion 63b and engagement portion 62a, are allowed to move relative to each other in the radial direction of Oldham coupling 60. As a result, the shaft misalignment that might occur between drive shaft 65 and driven shaft 26 as a first drive input unit can be absorbed.

In the meantime, as torque is transmitted from drive-side coupling member 61 to intermediate disc 63, engagement portion 61a pushes against rolling member 64 at points ϵ11, ϵ12, and rolling member 64 pushes against engagement portion 63a at points ϵ13, ϵ14.

In this event, engagement portion 61a pushes against rolling member 64 at the multiple points, and rolling member 64 pushes against engagement portion 63a at the multiple points. This reduces pressure to be applied to each of points ϵ11 to ϵ14 when torque is transmitted from drive-side coupling member 61 to intermediate disc 63. Thus, no deformation of engagement portions 61a, 62a, 63a, 63b occurs, and a decrease in the durability of Oldham coupling 60 can be suppressed.

Meanwhile, since rolling member 64 contacts engagement portions 61a, 63a at the positions which are point-symmetrical with respect to center C of rolling member 64, an axial component force of a force with which rolling member 64 pushes back against engagement portion 61a when engagement portion 61a pushes against rolling member 64 at points ϵ11, ϵ12 and an axial component force of a force with which rolling member 64 pushes against engagement portion 63a at points ϵ13, ϵ14 cancel each other.

Hence, engagement portions 61a, 63a are never moved axially or radially as torque is transmitted from drive-side coupling member 61 to intermediate disc 63. This enables a stable transmission of the torque.

Further, even when torque transmitted from drive-side coupling member 61 to intermediate disc 63 is large, it is possible to prevent engagement portions 61a, 63a from being deformed due to application of a large frictional load between engagement portion 61a and engagement portion 63a. Thus, engagement portions 61a, 63a can be operated smoothly without any lubricant such as oil, and therefore no excess load torque is applied to Oldham coupling 60. As a result, a decrease in the durability of Oldham coupling 60 can be suppressed.

Meanwhile, contact surfaces s11, s12, as well as contact surfaces s13, s14, are inclined to laterally sandwich rolling member 64 and form a V-shaped groove. Accordingly, even when intermediate disc 63 rotates about center C of rolling member 64 relative to drive-side coupling member 61 and driven-side coupling member 62, it is possible to prevent rolling member 64 from moving away from contact surfaces s11 to s14 and slipping off holding portions 231, 241.

Meanwhile, as illustrated in FIGS. 13 and 14, intermediate disc 63 can be rotated about center C of rolling member 64 relative to drive-side coupling member 61 in a certain angle range (for example, five degrees), and can be rotated about center C of rolling member 64 relative to driven-side coupling member 62 in a certain angle range (for example, five degrees).

Accordingly, even if there is a manufacturing error in image formation unit 20Bk or if image formation unit 20Bk cannot be positioned accurately, it is possible to absorb the angular displacement which might occur between drive shaft 65 and driven shaft 26.

Next, a third embodiment of the invention is described. Note that parts having the same structure as those of the first and second embodiments are given the same reference signs, and the effects of the first and second embodiments are used as the effects of the invention of such parts.

Figure 15:
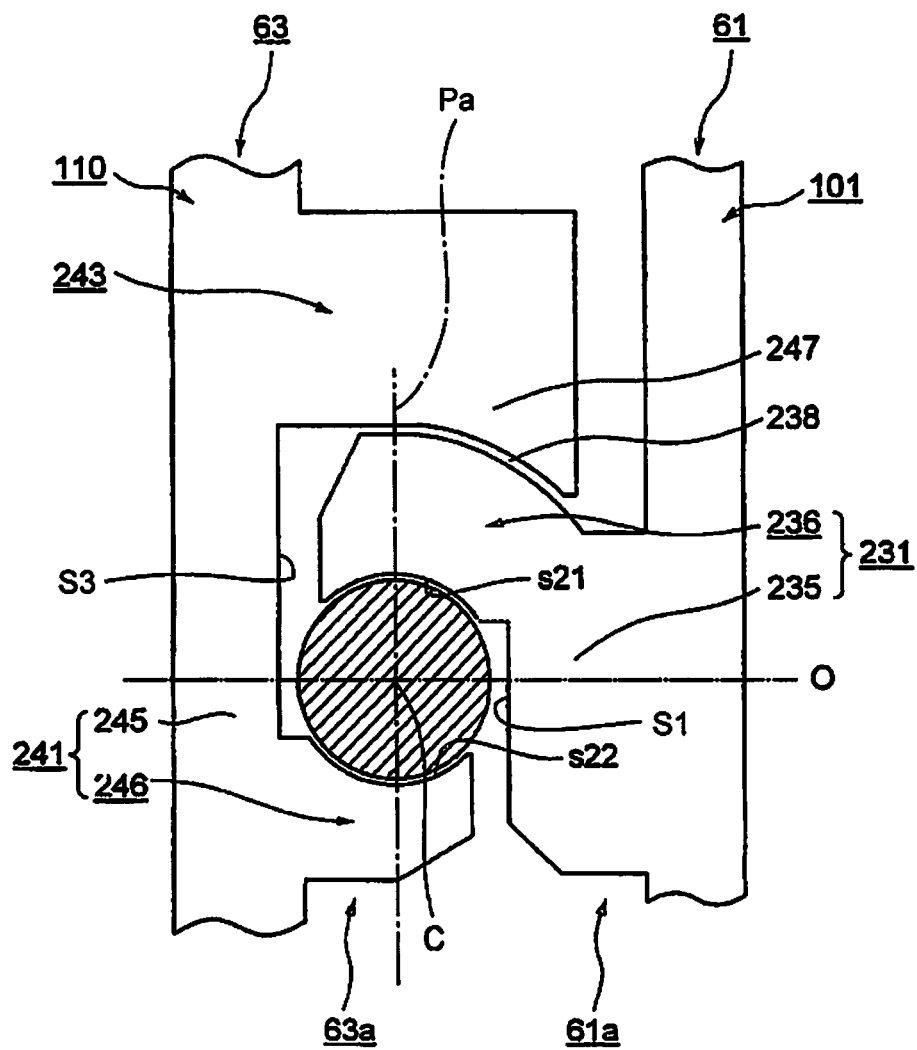
FIG. 15 is a diagram illustrating how engagement portions according to a third embodiment of the invention engage with each other.

FIG. 15 is a diagram illustrating how engagement portions according to the third embodiment of the invention engage with each other.

In the drawings, reference sign 61 indicates a drive-side coupling member as a first coupling member, 63 indicates an intermediate disc as an intermediate coupler, 61a, 63a indicate engagement portions, 101 indicates a flange portion, and 110 indicates a plate portion.

Engagement portion 61a has a certain shape (an "L" shape in this embodiment). Engagement portion 61a includes: holding portion 231 configured to hold rolling member 64; and stopper 132 (FIG. 7) formed at an inner end or outer end, in a radial direction of drive-side coupling member 61, of holding portion 231 and configured to prevent rolling member 64 from slipping off holding portion 231. Holding portion 231 includes: base portion 235 extending in a rotation direction of drive-side coupling member 61; and protrusion portion 236 standing on base portion 235 axially toward intermediate disc 63 and extending in the radial direction of drive-side coupling member 61. Locking groove 238 is formed in the back surface of protrusion portion 236.

Engagement portion 63a includes: holding portion 241 configured to hold rolling member 64; stopper 192 (FIG. 8) formed at an inner end or outer end, in the radial direction of intermediate disc 63, of holding portion 241 and configured to prevent rolling member 64 from slipping off holding portion 241; and locking portion 243 formed a certain distance away from holding portion 241. Holding portion 241 includes: base portion 245 being formed of plate portion 110 and extending in a rotation direction of intermediate disc 63; and protrusion portion 246 standing on base portion 245 axially toward drive-side coupling member 61 and extending in the radial direction of intermediate disc 63. Locking portion 243 stands on plate portion 110 axially toward drive-side coupling member 61, and has at its tip end locking protrusion 247 to enter locking groove 238.

Protrusion portion 236 has arcuate contact surface s21 to contact rolling member 64, and contact surface s21 forms a U-shaped groove surrounding a part of rolling member 64. Protrusion portion 246 has contact surface s22 to contact rolling member 64, and contact surface s22 forms a U-shaped groove surrounding a part of rolling member 64. Contact surfaces s21, s22 are formed point-symmetrically with respect to center C of rolling member 64. Here, the curvature radius of each of contact surfaces s21, s22 is set equal to, or slightly larger than, the curvature radius of rolling member 64.

In this configuration, rolling member 64 and engagement portion 61a contact each other over the entire contact surface s21 on protrusion portion 236, and rolling member 64 and engagement portion 63a contact each other over the entire contact surface s22 on protrusion portion 246.

Hence, even when torque is transmitted from drive-side coupling member 61 to intermediate disc 63, engagement portion 61a pushes rolling member 64 with the entire contact surface s21 and rolling member 64 pushes engagement portion 63a with the entire contact surface s22. This reduces pressure to be applied to each of contact surfaces s21, s22. Thus, no deformation of engagement portions 61a, 62a, 63a, 63b occurs, and a decrease in the durability of Oldham coupling 60 can be suppressed.

Meanwhile, since rolling member 64 contacts engagement portions 61a, 63a at the positions which are point-symmetrical with respect to center C of rolling member 64, an axial component force of a force with which rolling member 64 pushes back against engagement portion 61a when engagement portion 61a pushes against rolling member 64, and an axial component force of a force with which rolling member 64 pushes against engagement portion 63a, cancel each other.

Hence, engagement portions 61a, 63a are never moved axially or radially as torque is transmitted from drive-side coupling member 61 to intermediate disc 63. This enables a stable transmission of the torque.

Further, even when the torque transmitted from drive-side coupling member 61 to intermediate disc 63 is large, it is possible to prevent engagement portions 61a, 63a from being deformed due to application of a large frictional load between engagement portion 61a and engagement portion 63a. Thus, engagement portions 61a, 63a can be operated smoothly without any lubricant such as oil, and therefore no excess load torque is applied to Oldham coupling 60. As a result, a decrease in the durability of Oldham coupling 60 can be suppressed.

Meanwhile, each of contact surfaces s21, s22 forms a U-shaped groove laterally sandwiching rolling member 64. Accordingly, even when intermediate disc 63 rotates about center C of rolling member 64 relative to drive-side coupling member 61 and driven-side coupling member 62, it is possible to prevent rolling member 64 from moving away from contact surfaces s21, s22 and slipping off holding portions 231, 241.

Although the printer as the image formation apparatus is described in the above embodiments, the invention is applicable to a copier, a facsimile, a multifunction printer, and the like.

Note that the invention is not limited to the above embodiments but may be modified in various ways based on the gist of the invention. Accordingly, such modifications are to be deemed included within the scope of the invention.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A drive transmission device comprising:
a first coupling member configured to be coupled to a drive shaft to be rotatable integrally with the drive shaft, and including a first contact surface;
a second coupling member configured to be coupled to a driven shaft to be rotatable integrally with the driven shaft, and including a second contact surface; and
an intermediate coupler disposed between the first and second coupling members, wherein the intermediate coupler includes
a first intermediate contact surface opposed to the first contact surface and contacting the first contact surface with a first rolling member interposed in between, such that rotation of the first coupling member is transmitted to the intermediate coupler while the intermediate coupler is radially movable relative to the first coupling member, and
a second intermediate contact surface opposed to the second contact surface and contacting the second contact surface with a second rolling member interposed in between, such that rotation of the intermediate coupler is transmitted to the second coupling member while the intermediate coupler is radially movable relative to the second coupling member, and
further wherein
the first contact surface of the first coupling member and the first intermediate contact surface of the intermediate coupler are formed point-symmetrically with respect to a substantial center of the first rolling member, and
the second contact surface of the second coupling member and the second intermediate contact surface of the intermediate coupler are formed point-symmetrically with respect to a substantial center of the second rolling member,
wherein each of the first and second rolling members is a sphere.

2. The drive transmission device according to claim 1, wherein
the first coupling member includes an engagement portion having the first contact surface, the second coupling member includes an engagement portion having the second contact surface, and the intermediate coupler includes first and second engagement portions respectively having the first and second intermediate contact surfaces,
the first rolling member rotates between the engagement portion of the first coupling member and the first engagement portion of the intermediate coupler, and
the second rolling member rotates between the engagement portion of the second coupling member and the second engagement portion of the intermediate coupler.

3. The drive transmission device according to claim 1, wherein
the first contact surface forms a V-shaped groove including:
a first portion of the first contact surface on a same side of the first reference plane as the first opposing surface; and
a second portion of the first contact surface on the opposite side of the first reference plane from the first opposing surface,
the first intermediate contact surface forms a V-shaped groove including:
a first portion of the first intermediate contact surface on a same side of the first reference plane as the first intermediate opposing surface; and
a second portion of the first intermediate contact surface on the opposite side of the first reference plane from the first intermediate opposing surface,
the second contact surface forms a V-shaped groove including:
a first portion of the second contact surface on a same side of the second reference plane as the second opposing surface; and
a second portion of the second contact surface on the opposite side of the second reference plane from the second opposing surface, and
the second intermediate contact surface forms a V-shaped groove including:
a first portion of the second intermediate contact surface on a same side of the second reference plane as the second intermediate opposing surface; and
a second portion of the second intermediate contact surface on the opposite side of the second reference plane from the second intermediate opposing surface.

4. An image formation apparatus comprising the drive transmission device according to claim 1.

5. The image formation apparatus according to claim 4, further comprising
an image formation unit including a rotatable body and configured to form an image on a sheet medium,
wherein the rotatable body of the image formation unit is connected to a drive unit through the drive transmission device, whereby rotation of the drive unit is transmitted to the rotatable body.

6. A drive transmission device comprising:
a first coupling member configured to be coupled to a drive shaft to be rotatable integrally with the drive shaft, and including a first contact surface;
a second coupling member configured to be coupled to a driven shaft to be rotatable integrally with the driven shaft, and including a second contact surface; and
an intermediate coupler disposed between the first and second coupling members, wherein the intermediate coupler includes
a first intermediate contact surface opposed to the first contact surface and contacting the first contact surface with a first rolling member interposed in between, such that rotation of the first coupling member is transmitted to the intermediate coupler while the intermediate coupler is radially movable relative to the first coupling member, and
a second intermediate contact surface opposed to the second contact surface and contacting the second contact surface with a second rolling member interposed in between, such that rotation of the intermediate coupler is transmitted to the second coupling member while the intermediate coupler is radially movable relative to the second coupling member, and
further wherein
the first contact surface of the first coupling member and the first intermediate contact surface of the intermediate coupler are formed point-symmetrically with respect to a substantial center of the first rolling member, the second contact surface of the second coupling member and the second intermediate contact surface of the intermediate coupler are formed point-symmetrically with respect to a substantial center of the second rolling member, the first coupling member includes a first opposing surface perpendicular to the drive shaft, the second coupling member include a second opposing surface perpendicular to the drive shaft, the intermediate coupler includes
 a first intermediate opposing surface perpendicular to the drive shaft and opposed to the first opposing surface with the first rolling member interposed in between, and
 a second intermediate opposing surface perpendicular to the drive shaft and opposed to the second opposing surface with the second rolling member interposed in between, the first contact surface is located on at least an opposite side of a first reference plane, which includes a center of the first rolling member and is perpendicular to the drive shaft, from the first opposing surface, the first intermediate contact surface is located on at least an opposite side of the first reference plane from the first intermediate opposing surface, the second contact surface is located on at least an opposite side of a second reference plane, which includes a center of the second rolling member and is perpendicular to the drive shaft, from the second opposing surface, and the second intermediate contact surface is located on at least an opposite side of the second reference plane from the second intermediate opposing surface.

7. The drive transmission device according to claim 6, wherein
the first opposing surface and the first intermediate opposing surface are spaced apart from the first rolling member, and
the second opposing surface and the second intermediate opposing surface are spaced apart from the second rolling member.

8. The drive transmission device according to claim 6, wherein
the first contact surface includes:
 a first portion of the first contact surface on a same side of the first reference plane as the first opposing surface; and
 a second portion of the first contact surface on the opposite side of the first reference plane from the first opposing surface,
the first intermediate contact surface includes:
 a first portion of the first intermediate contact surface on a same side of the first reference plane as the first intermediate opposing surface; and
 a second portion of the first intermediate contact surface on the opposite side of the first reference plane from the first intermediate opposing surface,
the second contact surface includes:
 a first portion of the second contact surface on a same side of the second reference plane as the second opposing surface; and
 a second portion of the second contact surface on the opposite side of the second reference plane from the second opposing surface, and
the second intermediate contact surface includes:
 a first portion of the second intermediate contact surface on a same side of the second reference plane as the second intermediate opposing surface; and
 a second portion of the second intermediate contact surface on the opposite side of the second reference plane from the second intermediate opposing surface.

9. The drive transmission device according to claim 6, wherein
the first contact surface forms a U-shaped groove including:
 a first portion of the first contact surface on a same side of the first reference plane as the first opposing surface; and
 a second portion of the first contact surface on the opposite side of the first reference plane from the first opposing surface,
the first intermediate contact surface forms a U-shaped groove including:
 a first portion of the first intermediate contact surface on a same side of the first reference plane as the first intermediate opposing surface; and
 a second portion of the first intermediate contact surface on the opposite side of the first reference plane from the first intermediate opposing surface,
the second contact surface forms a U-shaped groove including:
 a first portion of the second contact surface on a same side of the second reference plane as the second opposing surface; and
 a second portion of the second contact surface on the opposite side of the second reference plane from the second opposing surface, and
the second intermediate contact surface forms a U-shaped groove including:
 a first portion of the second intermediate contact surface on a same side of the second reference plane as the second intermediate opposing surface; and
 a second portion of the second intermediate contact surface on the opposite side of the second reference plane from the second intermediate opposing surface.

10. A drive transmission device comprising:
a first coupling member configured to be coupled to a drive shaft to be rotatable integrally with the drive shaft, and including a first contact surface;
a second coupling member configured to be coupled to a driven shaft to be rotatable integrally with the driven shaft, and including a second contact surface; and
an intermediate coupler disposed between the first and second coupling members, wherein the intermediate coupler includes
 a first intermediate contact surface opposed to the first contact surface and contacting the first contact surface with a first rolling member interposed in between, such that rotation of the first coupling member is transmitted to the intermediate coupler while the intermediate coupler is radially movable relative to the first coupling member, and
 a second intermediate contact surface opposed to the second contact surface and contacting the second contact surface with a second rolling member interposed in between, such that rotation of the intermediate coupler is transmitted to the second coupling member while the intermediate coupler is radially movable relative to the second coupling member, and
further wherein
the first contact surface of the first coupling member and the first intermediate contact surface of the intermediate coupler are formed point-symmetrically with respect to a substantial center of the first rolling member, the second contact surface of the second coupling member and the second intermediate contact surface of the intermediate coupler are formed point-symmetrically with respect to a substantial center of the second rolling member, and at least one of the contact surfaces is inclined with respect to the drive shaft.

* * * * *